Dec. 2, 1930.  W. H. SOMMER  1,783,946
WIRE FENCE MACHINE
Filed Jan. 14, 1929   10 Sheets-Sheet 2
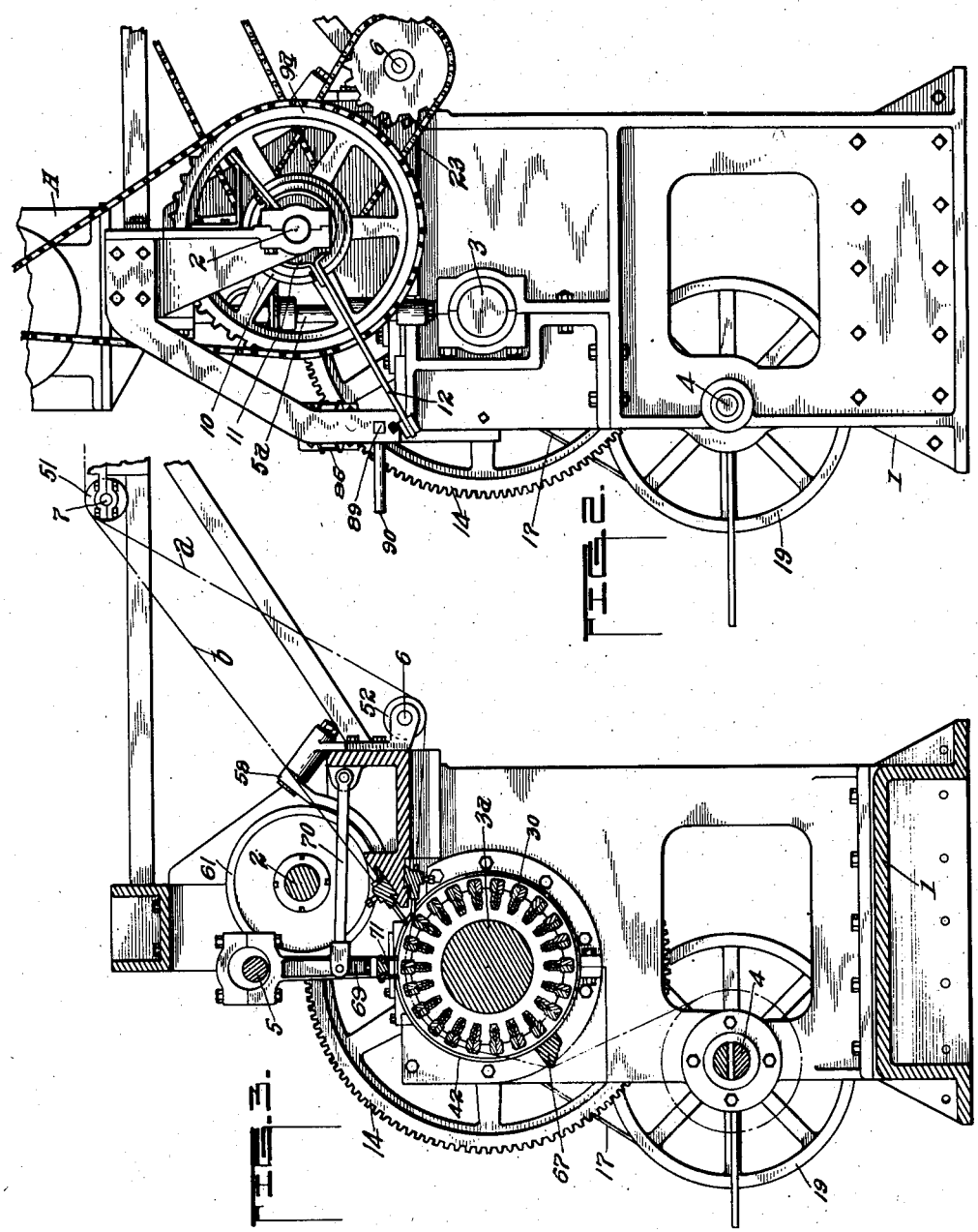
INVENTOR.
William H. Sommer
ATTY Dec. 2, 1930.  W. H. SOMMER  1,783,946
WIRE FENCE MACHINE
Filed Jan. 14, 1929  10 Sheets-Sheet 3
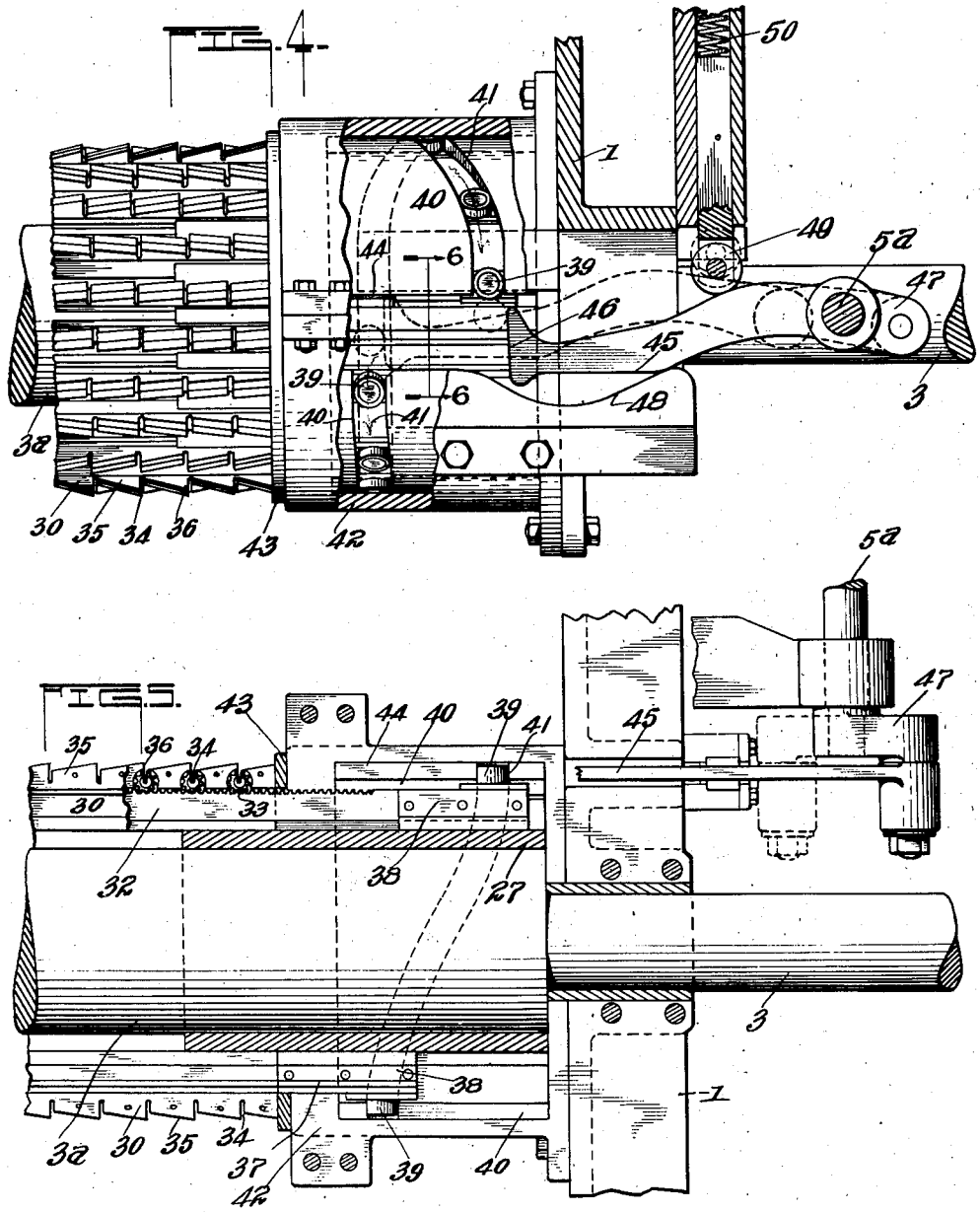
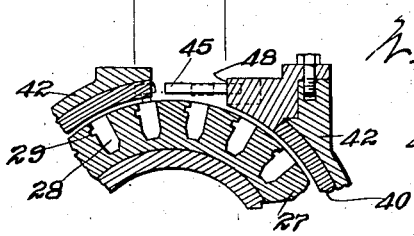

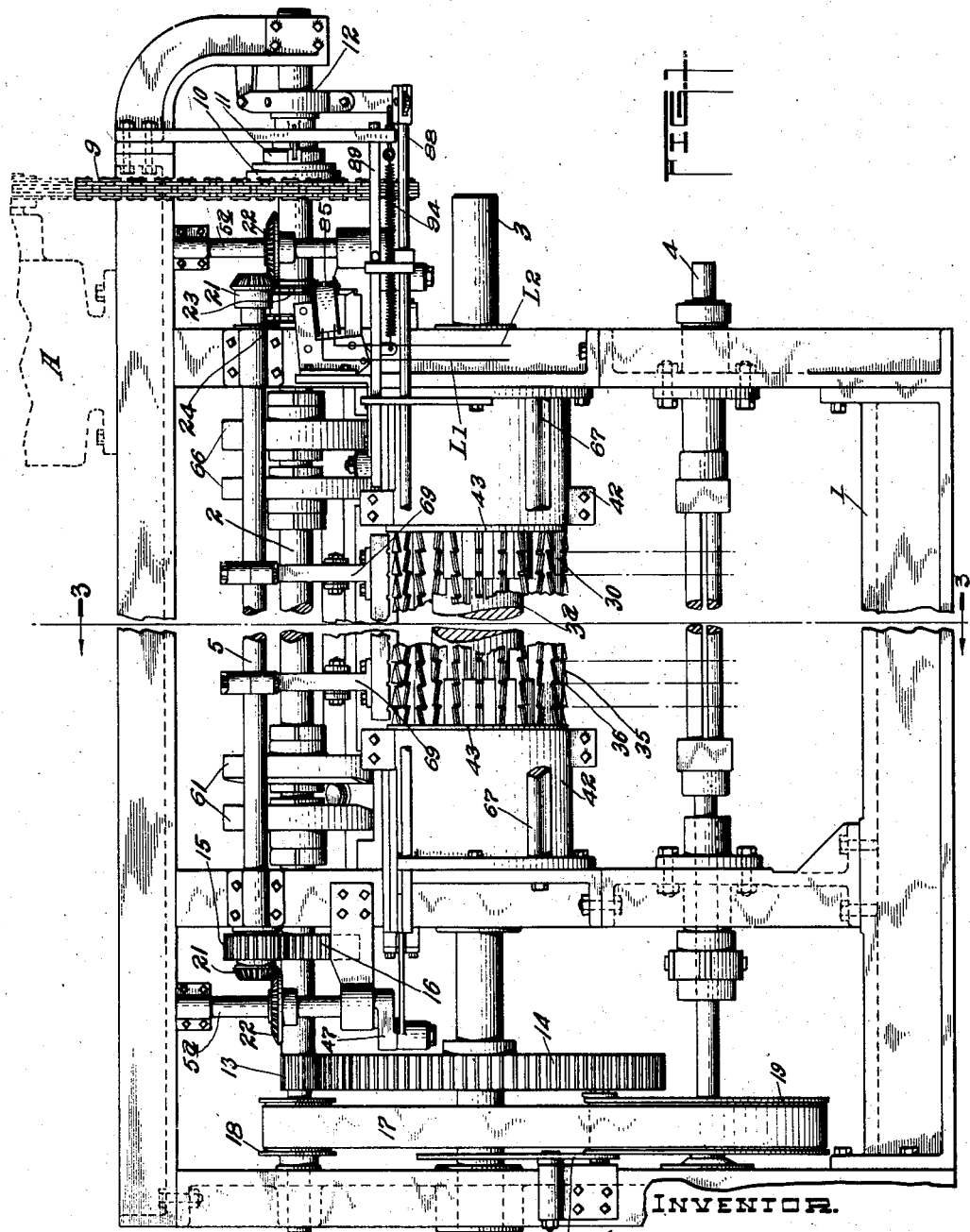

Dec. 2, 1930.  W. H. SOMMER  1,783,946
WIRE FENCE MACHINE
Filed Jan. 14, 1929   10 Sheets-Sheet 4

INVENTOR.
William H. Sommer
Chas. H. LaPorte
ATTY'S

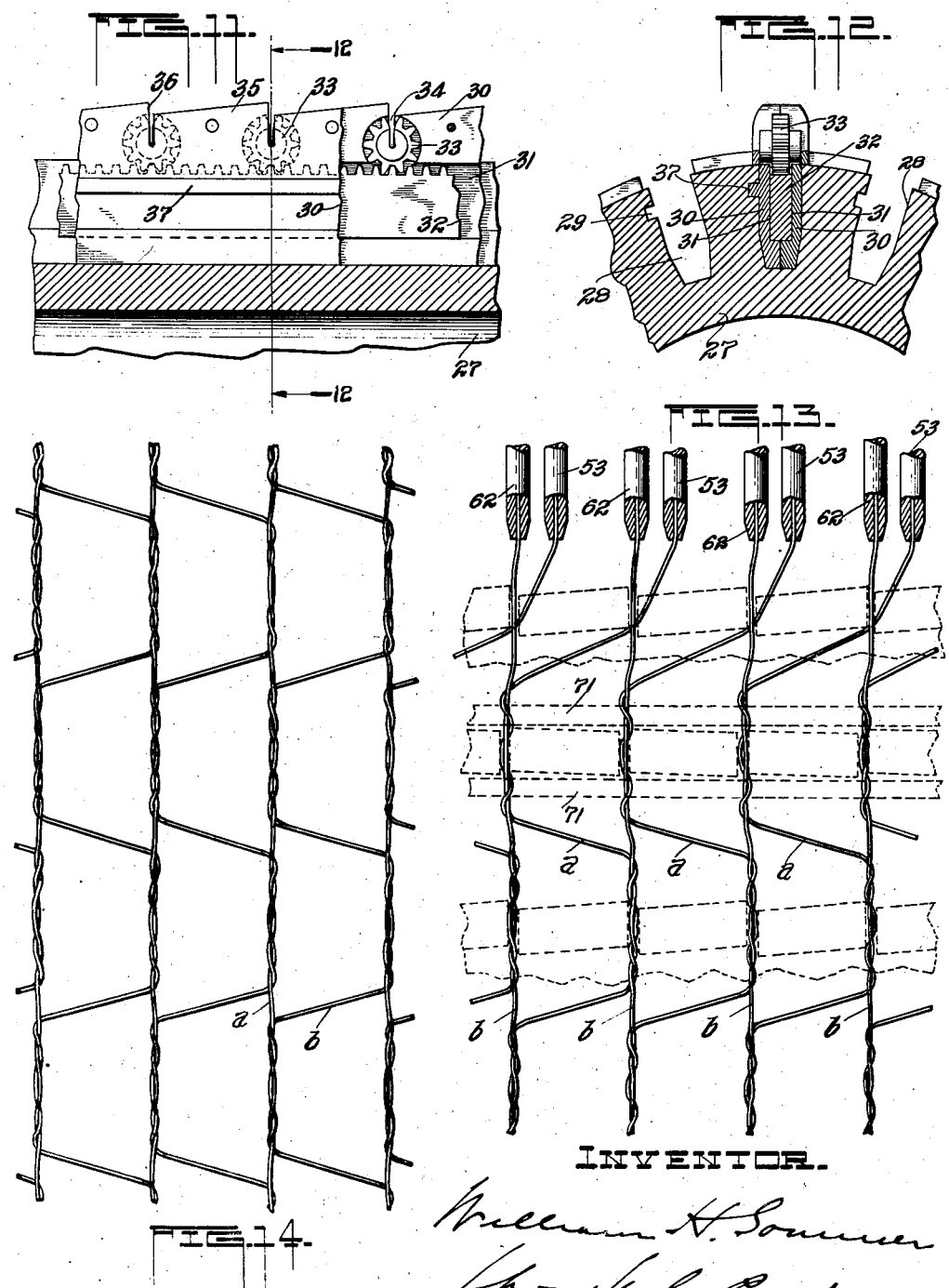

Dec. 2, 1930.   W. H. SOMMER   1,783,946
WIRE FENCE MACHINE
Filed Jan. 14, 1929   10 Sheets-Sheet 6
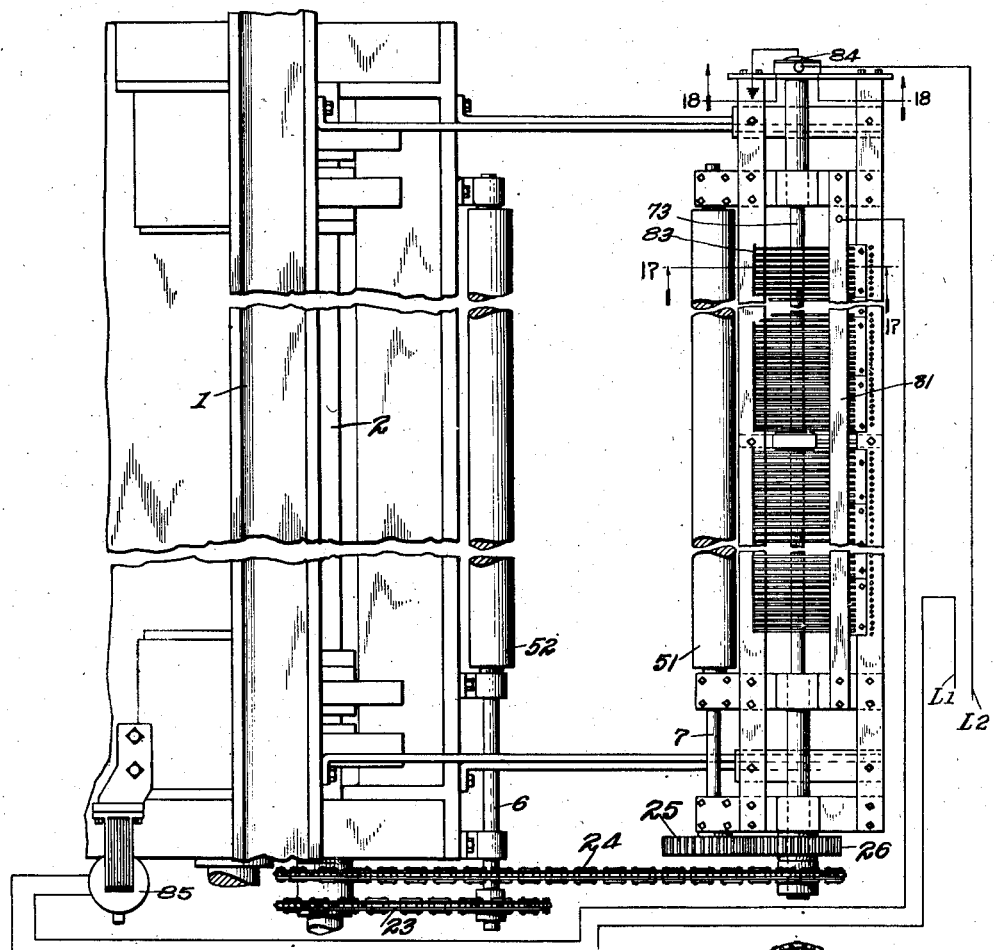
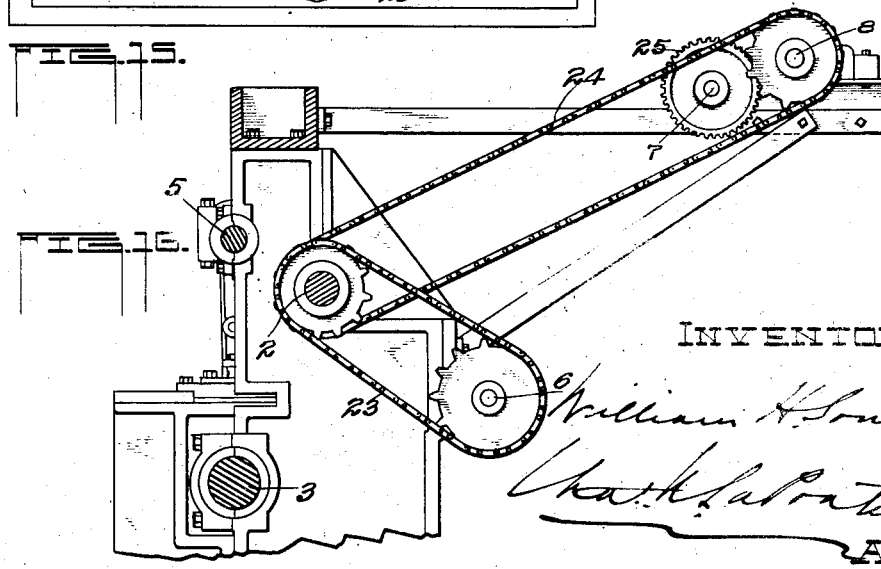
FIG. 15.
FIG. 16.
INVENTOR
William H. Sommer
ATTY

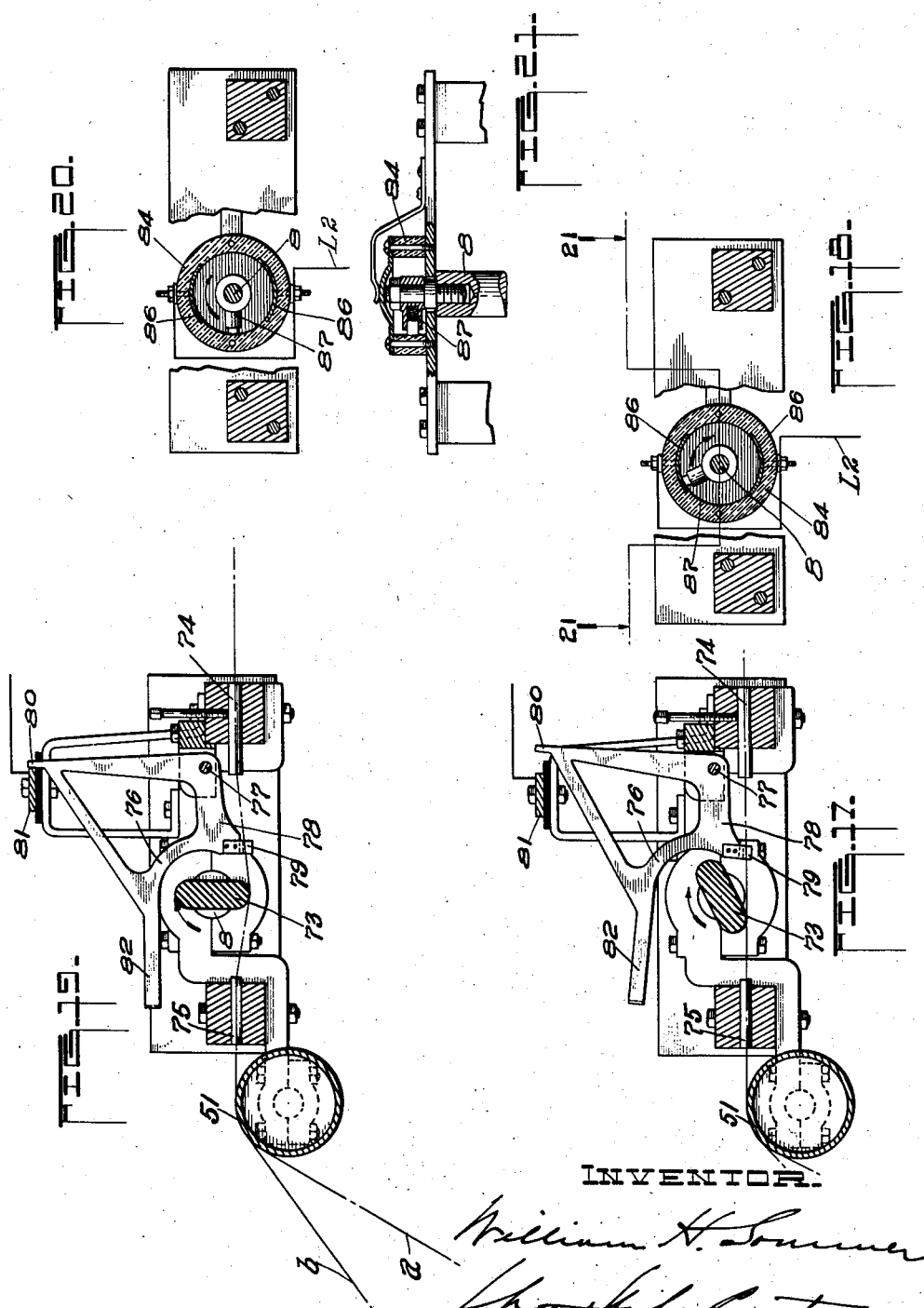

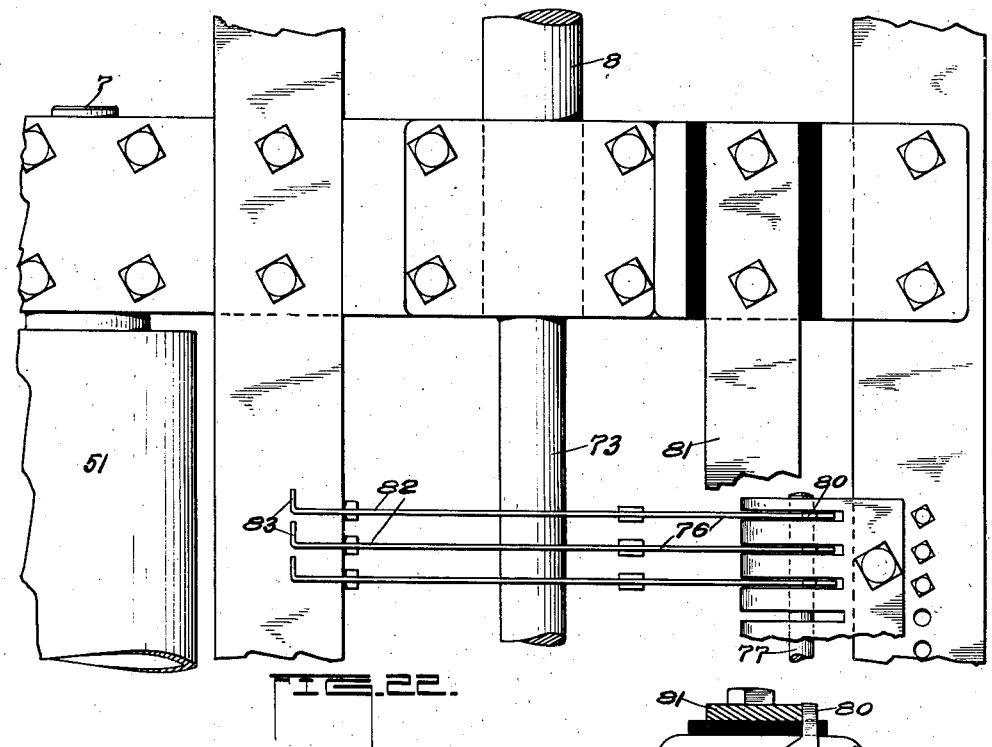
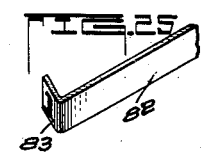
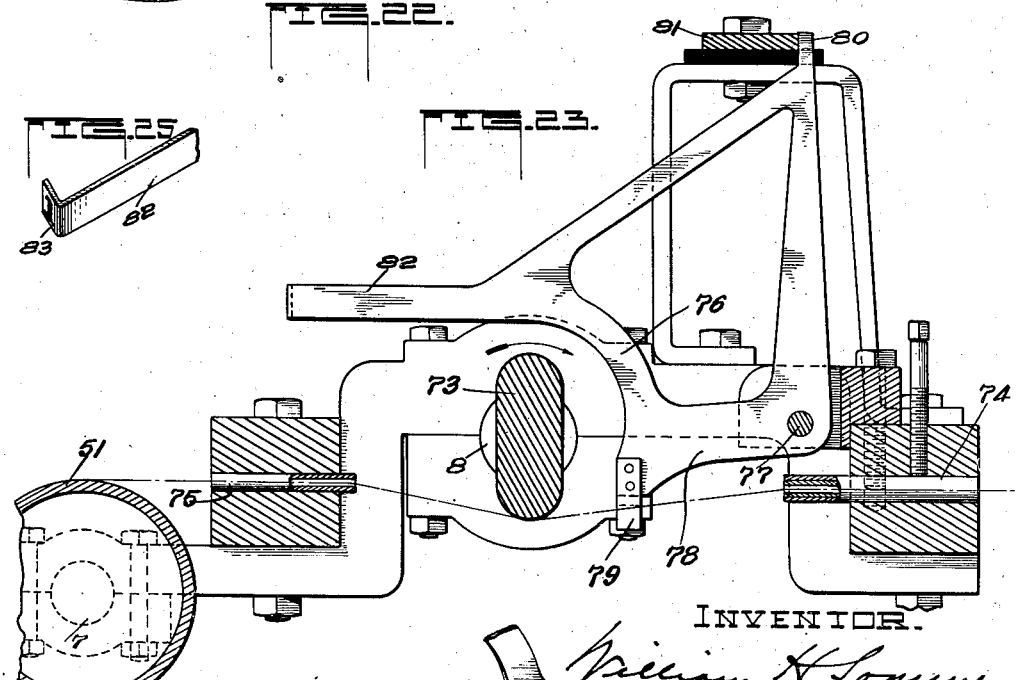

Dec. 2, 1930.  W. H. SOMMER  1,783,946
WIRE FENCE MACHINE
Filed Jan. 14, 1929  10 Sheets-Sheet 9

INVENTOR.
William H. Sommer
Charles LaPorte
ATTY

Dec. 2, 1930.  W. H. SOMMER  1,783,946
WIRE FENCE MACHINE
Filed Jan. 14, 1929   10 Sheets-Sheet 10
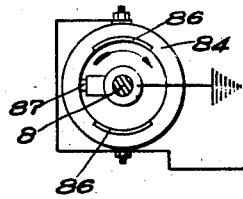
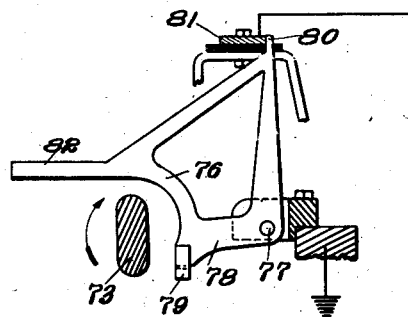
FIG.29.
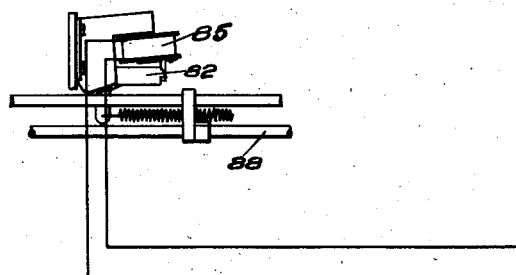
INVENTOR.
William H. Sommer
ATTY Patented Dec. 2, 1930

1,783,946

UNITED STATES PATENT OFFICE

WILLIAM H. SOMMER, OF PEORIA, ILLINOIS

WIRE-FENCE MACHINE

Application filed January 14, 1929. Serial No. 332,343.

This invention has reference to a wire fence machine, and it relates particularly to that type of such machine on which may be manufactured light weight poultry nettings and preferably what is known as "straight-line poultry fence", the wires constituting which, are of very light gauge.

The machine embodies the principle of the "rotary" idea; that is to say, the fabric or netting is woven on a rotating drum which includes in its structure twister or rack-bars adapted to be reciprocated axially of the drum and during rotation thereof, such twister bars adapted to actuate twisters for connecting the weft or woof wires and the warp or strand wires, which comprise the fabric. No claim is made to the rotating drum, twister bars and twisters, per se, as I am aware that such structure, broadly, is not new.

The invention has for one of its objects to improve the mounting for the rack-bars on the drum and to improve the operating means for reciprocating said rack-bars during the rotation of the drum.

The invention has for a further object the arrangement and disposition of the twisters of the alternate rows of twisters, whereby to allow, in part, the necessary wire in the warp or strand wires to provide for the twist therewith of the weft or woof wires, and when twisted to obviate and prevent contraction of the netting and as a result kept the fabric taut and straight.

The invention has for a further object to improve the means for directing and laying the weft or woof wires and the warp or strand wires in the paths of the twisters, during the rotation of the drum and in the provision of means for depressing the weft or woof wires and the warp or strand wires in the twisters, as they are moved into receiving position, as the drum is rotated; whereby, the necessary wire is laid into the twisters to provide the material sufficient for the twisting of the wires together without straining or stretching the wires in twisting.

A further object of the invention is in the provision of means for automatically stopping the machine on the breaking of any one of the weft or woof wires or any one of the warp or strand wires, and of means to graphically indicate to the operator which one of the many wires has broken; whereby, a prompt replacement or rethreading, as the case may be, may be effected.

A further object of the invention is in a means for electrically operating the means resulting in the stoppage of the machine.

The prompt and efficient stoppage of the machine, on a wire breaking, and the employment of an indicating means, by which the operator may be instantly apprised of which of the wires broke, is occasioned by the style and character of the netting being woven and the multiplicity of wires required in a netting of this character. When it is understood that these nettings are made in heights of six feet and over and that the warp or strand wires are spaced approximately one inch apart and that weft or woof wires are woven to connect adjacent warp or strand wires, the value of such a stopping and indicating means will become readily apparent.

Other and further objects will more fully appear from the following description.

That the invention may be more fully understood, reference is had to the accompanying drawings forming part of this description, illustrating a preferred embodiment of the invention, in which :—

Fig. 1 is a front elevation of a machine embodying my invention, the same being shown broken in two thereby shortening the length of the drum and wire connecting means, which may be of any desired length;

Fig. 2 is a side elevation of the machine, looking in at the right hand side of Fig. 1, the wire breaking indicator being omitted;

Fig. 3 is a vertical cross-section thru the machine, as the same would appear if taken on the line 3—3, Fig. 1, the wire breaking indicator being omitted;

Fig. 4 is a detail spot view in plan, partly in section and partly broken away, showing the rack-bar shifting means;

Fig. 5 is a longitudinal sectional view, as the same would appear, taken thru Fig. 4;

Fig. 6 is a detail spot view, in section, as the same would appear if taken on the line 6—6, Fig. 4;

Fig. 11 is a spot view in front elevation, partly in section showing the rack-bar and twister arrangement and manner of assembling the same;

Fig. 12 is a detail in cross-section as the same would appear if taken on the line 12—12, Fig. 11;

Fig. 13 is a spot view, in plan, showing the manner of laying the warp or strand wires and the weft or woof wires in the twisters, on the drum, and the manner of moving the weft or woof wires back and forth from one warp or strand wire to the other;

Fig. 14 is a spot view, showing the finished "straight-line poultry fence" made on the machine;

Fig. 15 is a plan view, partly broken away, showing the arrangement of the mechanism for indicating to the operator the location of a wire which may break and including the means for electrically actuating the mechanism for stopping the machine on the breaking of a wire;

Fig. 16 is a side elevation of the mechanism shown in Fig. 15;

Fig. 17 is a detail in section, as the same would appear if taken on the line 17—17, Fig. 15, showing the indicator means in its relation to a timing and depresser shaft and an electrical contact;

Fig. 18 is a detail in section of the timer, as the same would appear if taken on the line 18—18, Fig. 15, showing the position of its contact members in their relation to the indicator mechanism in Fig. 17, at predetermined positions of such mechanism;

Fig. 19 is a view somewhat similar to Fig. 17, except that the timing and depresser shaft is in a different position, having made part of a revolution and the indicator means has also moved;

Fig. 20 is a view somewhat similar to Fig. 18 and shows the timer contact members in relative positions in relation to the predetermined position of the indicator means in Fig. 19;

Fig. 21 is a sectional detail, in plan, of the timer as it would appear if taken on the line 21—21, Fig. 18;

Fig. 22 is an enlarged spot view, in plan, of the indicator mechanism shown in Fig. 15;

Fig. 23 is an elevation, partly in section, of what is shown in Fig. 22, and of the parts shown in Fig. 19;

Fig. 24 is a detail in perspective showing a wire guide associated with an indicator member;

Fig. 25 is a detail in perspective showing the end of an indicator member on which is placed an indicator character, such as a numeral or other designating symbol to provide a graphic guide for the operator in locating a wire which has broken;

Fig. 29 is a wiring diagram including the indicator mechanism, timer and solenoid.

Like characters of reference denote corresponding parts thruout the figures.

Figure 7:
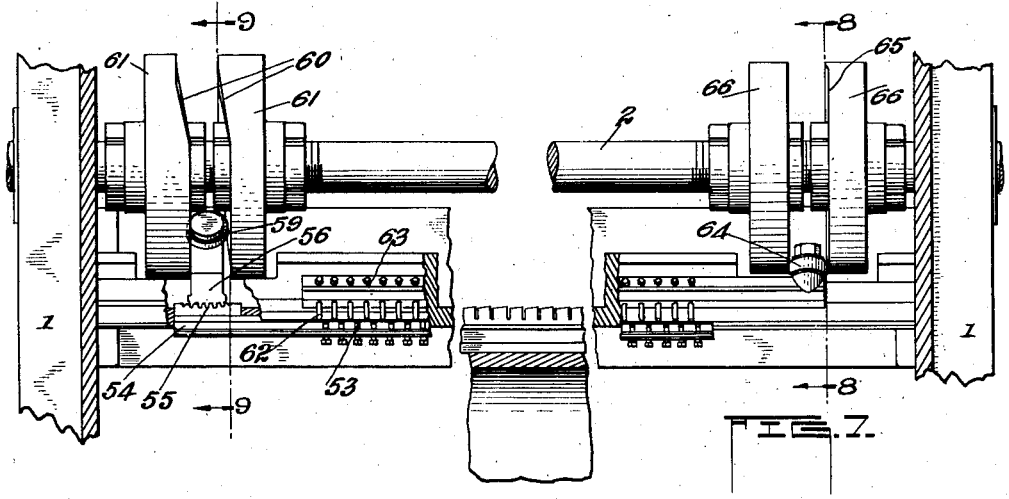
Fig. 7 is a spot view, in front elevation, partly in section and partly broken away, showing the mechanism for laying the wires in the twisters.

In describing the machine I have designated the frame generally, as 1; so that the use of the term "frame" thruout the specification will include any and all frame parts, of whatever character they may be, which support, brace and connect the several machine elements.

For use in driving or operating the numerous movable elements of the machine, I preferably employ an electric motor A, see Figs. 1 and 2, which is mounted on the top of the frame at one side of the machine.

In the machine assembly there are numerous shafts of which 2 designates the driving and cam shaft; 3 the drum shaft; 4 the take-off shaft or mandrel; 5 the eccentric shaft; 6 and 7 counter-shafts; 8 a timer shaft and 5$^a$ crank-shafts.

The driving and cam shaft 2 is adapted to be driven direct from the motor A thru and by means of a link-belt 9, sprocket wheel 9$^a$ and clutch parts 10 and 11, the latter movable into and out of clutch connection with the clutch part 10. A lever bar 12 associated with the clutch part 11 and having a pivotal connection with the frame, being provided for this purpose. Said shaft 2 is geared direct to the drum shaft 3 thru a gear pinion 13 and a gear 14 and is, also, geared direct to the eccentric shaft 5 thru gearing 15 and 16. The take-off shaft or mandrel 4 is belted to the drive and cam shaft 2 by means of a belt 17 and pulley wheels 18 and 19, see Figs. 1, 2 and 3 with the belt 17 engaging the usual belt tightener 20, see Fig. 1. The crank-shafts 5$^a$ are geared direct to the driving and cam shaft 2 thru bevel gears 21 and 22, see Fig. 1. The counter shaft 6 is driven from the driving and cam shaft 2 thru a sprocket chain 23, see Figs. 2, 15 and 16 and connected sprocket wheels on the respective shafts. The counter shaft 7 is likewise driven from the driving and cam shaft 2 thru a sprocket chain 24, see Figs. 2, 15 and 16 and connected sprocket wheels on the respective shafts and the timer shaft 8 is geared direct to and driven from the counter shaft 7, thru gears 25 and 26, see Figs. 15 and 16. The take-off shaft or mandrel 4 is not unlike similar parts in machines of this character and further than stating that the finished netting is wound on this shaft and the shaft constructed so that the mandrel may be removed with a finished roll of netting, nothing further need be said, as this is common to machines of this character. All the above enumerated shafts are suitably journaled or have bearings on the machine frame, as will of course, be understood.

The drum shaft 3 is provided with an enlargement 3ª preferably extending between uprights of the frame and said enlargement forms or provides the core of the drum on and about which the twisters, rack-bars and operating means are mounted. Such structure is best seen in Figs. 1, 4, 5, 6, 11 and 12. At opposite ends of the core 3ª are located cylindrical casings 27, which extend inwardly of the core, from the uprights of the frame, for a suitable distance. These casings 27 have a wall depth or thickness, wherein may be provided a multiplicity of radially disposed longitudinally arranged slots or seats 28 which open out of the peripheral faces of said casings, see Fig. 12. The opposite walls of the slots or seats 28 are parallel thruout their greatest depth, from the periphery of the casings, then converge toward each other to the base of such slots or seats and in one of said parallel walls there is provided a longitudinal groove 29. Seated in the slots or seats 28 of each casing 27 and extending therebetween and longitudinally of the core 3ª are complementary rack supporting and guide bars 30 which have outer surface formations corresponding to the walls of the slots or seats 28, see Fig. 12, and said bars 30 are joined at their base portions within said seats or slots 28 and at their outer or exposed portions beyond the surface of the casings 27. Between such joined portions, said bars 30 are spaced apart to provide guides 31 for the reception and guidance of reciprocal rack-bars 32, with which, have a meshing relation with slotted toothed twister pinions 33 having hub portions journaled for rotation in bearing seats formed or provided in the matching faces of the bars 30 and said bars 30, in radial disposition coincident with the axes of said twisters are slotted, as at 34 for the entrance of wires thereinto and to the slots in the twisters. The outer surfaces of each set of bars, around the drum, are provided with a succession of inclined portions 35, starting with a shouldered portion 36, at one slot and beyond the surface of a twister and terminating at the next succeeding slot approximately flush with the peripheral surface of the coincident twister. These inclined surfaces of alternate sets of bars 30 extend from a shouldered portion 36 in one direction, the length of the bars and in the next and alternate sets of bars such inclinations extend in the opposite direction, for purposes which will more fully appear. One of such bars 30, of each set of bars, is provided with a rail 37, see Fig. 12 fitting a longitudinal groove 29 and these rails in conjunction with the joining of the sets of bars 30 prevent radial displacement of such bars in the casings 27. The alternate rack-bars, at opposite ends, have connected therewith plates 38 which carry rollers 39 disposed above the surfaces of said rack-bars, see Fig. 5, and surrounding the casings 27 and the rack-bars mounted thereon are cam rings 40 having cam grooves 41 in which travel the rollers 39, as the shaft 3, casings 27 and rack-bars and twisters are rotated. These cam rings are enclosed within sectional housings 42 secured together and to the uprights of the frame. The inner ends of said housings are faced by spacing rings 43 with which abut the ends of the sets of bars 30. As will be seen from an examination of Figs. 4, 5 and 6, the cam rings 40 are split, as at 44, with a space therebetween and that such split portions are at the top side of the drum and the cam grooves at one end terminate at or near one end of the cam rings and their opposite ends terminate at or near the opposite ends of said cam rings. Also, as will be seen from an examination of Fig. 4, the rollers 39 on the rack-bars emerge from the cam grooves 41 and enter the split portions of the cam rings at or near the outer ends of the drum and again enter the cam grooves from the split portions, removed from the end of the drum and at or near the inner ends of the cam rings. The operative movement of the rack-bars is between the point of emergence of the rollers 41 leaving one end of a cam groove, their travel along or thru the split portions of the cam rings and again entering the cam grooves. The rollers 39 on entering a cam groove, see Fig. 4, have movement which withdraw the rack-bars slightly to rotate the twisters to wire releasing position, as the drum revolves and to permit the finished netting to be withdrawn from the twisters, from there and for a considerable portion of the cam grooves, the rollers 39 travel circumferentially of the drum without any real or perceptible movement being imparted to the rack-bars and from thence the cam grooves are more pronounced so that by the time the rollers 39 reach the end of the cam groove at the split portion of the cam ring, the rack-bars and twisters have been caused to assume positions permitting the laying of wires in the twisters and the movement longitudinally of the rack-bars to rotate the twisters and to intertwist the weft or woof wires and the warp or strand wires engaged thereby.

To reciprocate the respective rack-bars 32 in a forward direction, to operate the twisters to connect the weft or woof wires and warp or strand wires, I provide pushing and switching bars 45, see Fig. 4; it being understood that after each twisting operation the rack-bars are returned to initial starting position by the rollers 39 being caused to traverse the cam grooves 41, referred to. There are two such bars 45, one at each end of the drum and having a timed relation with respect to each other so that they are operative alternately to reciprocate the alternate and successive rack-bars as they are moved into position by the drum. These bars have the free end or foot portions 46, whereas their opposite or outer end portions have a pivotal connection with cranks 47 connected with the lower end portions of the crank shafts $5^a$. As the shafts $5^a$ rotate, the bars 45 have reciprocal movement longitudinally of the drum, and the free end or foot portions thereof travel back and forth in the split portions 44 of the cam rings 40. The movement of these bars are so timed in their relation to the rotation of the drum and the positioning of the alternate rack-bars for operation, that the foot portions of said bars assume a position substantially as shown in full lines in Fig. 4, so that the acting face of such foot portions become in effect continuations of the cam 41 and immediately on the rollers 39 coming into contact with a foot 46 the bar 45 is moved forwardly switching the roller 39 from its position of discharge or emergence from the cam groove 41 to its entering position in such groove. In the meantime and as the drum is rotated and the bar 45 moved forwardly, the roller 39 moves across the face of the foot 46 of the bar 45, as shown by the dotted line in Fig. 4, and the rack bar of the respective roller acted upon is reciprocated forward to operate a row of twisters for connecting the wires. The forward and acting ends of the bars 45 are free but are guided in the split portions of the cam rings 40, as the cranks 47 are rotated, by a fixed cam surface 48 disposed on one side of travel of said bars 45 and by a roller 49 held under tension of a spring 50, on the other side of travel of said bars. I prefer that the reciprocal forward movement of the bars 45 shall be started slowly and the speed of the stroke increased during their movement and gradually decreased to the end of the stroke and accomplish this in the provision of the cranks 47, and the arrangement is such that when the forward movements of the bars 45 begin, the pivotal connection between the bars 45 and the cranks 47 is approximately at dead center, see Fig. 4.

The slots 34 in one set of bars 30, in their relation to corresponding slots in the next succeeding set of bars 30 are slightly offset; or in other words, the slots 34 in the alternate sets of bars are slightly staggered in their relation to each other, as is best seen in Fig. 13. This arrangement will allow, in part, for the necessary wire in the warp or strand wires to provide for the twist thereof with the weft or woof wires and when twisted to obviate and prevent contraction of the warp or strand wires between the respective twists therein and as a result keep the fabric taut and straight.

Figures 8, 9:
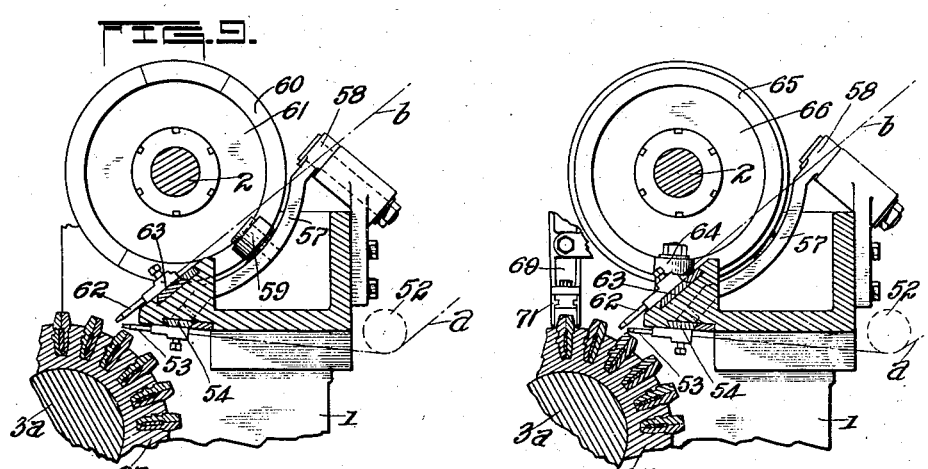
Fig. 8 is a detail in section, as the same would appear if taken on the line 8—8, Fig. 7 and including a part of the drum and wire twister means and a part of the wire depresser or packer.
Fig. 9 is a view somewhat similar to Fig. 8, except that it is as it would appear if taken on the line 9—9, Fig. 7.

I have designated the weft or woof wires $a$ and the warp or strand wires $b$. These wires are fed into the machine from suitable blocks, spools or other supply means, not shown, and in passing to the machine have association with certain indicator and stop mechanism to be described. Both the wires $a$ and $b$ are directed over a roller or individual wheels 51, as the case may be, on the counter shaft 7 and in addition the wires $a$ are directed under a roller or individual wheels 52, as the case may be, on the counter shaft 6. The wires $a$ are directed to and laid on the drum and guided to the twisters 33 by means of reciprocally supported bushings 53, one for each wire $a$ and thru which the wires $a$ are threaded and have movement. These bushings comprise a set and will be referred to as the lower set of bushings, and each of said bushings are removably held in a common slide bar 54 dovetailed to have endwise sliding movement in a support of the frame of the machine, see Figs. 8 and 9. One end of the bar 54 is provided with a toothed segment 55, see Fig. 7, and said segment has a meshing relation with a segmental gear end 56 of a lever bar 57 pivoted at 58 to a frame part, see Fig. 9, and said lever bar carries a roller 59 having contact with and adapted to be acted upon by complementary cam surfaces 60 of matching and spaced cam wheels 61 carried on and rotatable with the driving and cam shaft 2. On examining Fig. 7 it will be observed that these cam wheels are adjustable axially of and on the shaft 2 to regulate the stroke of the lever 57 and the movement of the bar 54. The wires $b$ are directed to and laid on the drum and guided to the twisters 33 by means of reciprocally supported bushings 62, one for each wire $b$ and thru which the wires $b$ are threaded and have movement. These bushings comprise a set and will be referred to as the upper set of bushings, and each of said bushings are movably held in a common slide bar 63 dovetailed to have endwise sliding movement in the same support of the frame carrying the bar 54, see Figs. 8 and 9. One end of the bar 63 carries a roller 64 having contact with and adapted to be acted upon by complementary cam surfaces 65 of matching and spaced cam wheels 66 carried on and rotatable with the driving and cam shaft 2. On examining Fig. 7 it will be observed that these cam wheels, like the cam wheels 61, are adjustable and for the same purposes as cam wheels 61. Furthermore, on examining Figs. 7, 8 and 9, it will be observed that the cam structure and associated parts for the bar 54 will impart a much longer stroke or reciprocal movement to said bar than will the corresponding parts or mechanism for the bar 63. The reason for this should be readily apparent. The upper set of bushings 62, thru which the warp or strand wires $b$ are fed, need only have sufficient sidewise movement to position such wires that they may be received in the corresponding slots 34 of the successive sets of bars 30, which, as previously stated, have a slight staggered relation with respect to each other. This movement and extent thereof can be best seen and understood on referring to Fig. 13. The lower set of bushings 53, thru which the weft or woof wires $a$ are fed, must have sufficient sidewise movement to position such wires that they may be received in alternate slots 34 and by the coincident twisters, of the successive sets of bars 30. In other words, looking at Fig. 13, a bushing 53 has sidewise movement from one warp or strand wire $b$ to the next, whereby to alternately position its weft or woof wire $a$ that it may be first twisted with one warp or strand wire and then with the next and adjoining on one side thereof and this movement carries on all the time the machine is in operation and produces thereby, the form, style and character of mesh in the netting, exhibited in Figs. 13 and 14. During the sidewise movements of the bushings 53, and as the wires $a$ are directed over the surfaces of the sets of bars 30 and from one slot 34 to the other, the shoulders 36 on said bars 30 form abutments to hold the wires in their angular positions to insure proper and regular mesh formations, as seen in Fig. 13. The shoulders 36 of the successive sets of bars 30 are alternately disposed, as explained, since the successive rack-bars are alternately shifted in opposite directions and the bushings 53 are moved back and forth from the position of one warp or strand wire to another. These upper and lower sets of bushings 62 and 53, respectively, have their delivery ends so disposed in relation to the rotation of the drum and the twisters thereon that the wires $a$ and $b$ are laid into each row of twisters as they assume a position almost perpendicular to a vertical line intersecting the axis of the drum, see Fig. 3 and as will be understood from the operation of the pushing and switching bars 45 the operation of the rack-bars and the twisters begins when such rack-bars have assumed a position at the top of the drum or one perpendicular to a vertical line intersecting the axis of the drum and the twisting is done during a very short travel of said drum and it is during a short travel of the rollers 39 in the more or less concentric portions of the cams 41 that the completed twisted portions of the wires $a$ and $b$ are removed from the sets of bars 30 and twisters 33 carried thereby, and the completed netting caused to pass over a stationary guide 67 which holds the netting under tension as it is rolled upon the take-off shaft or mandrel 4.

Figure 10:
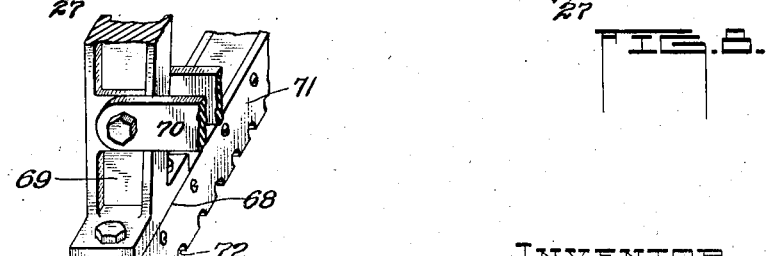
Fig. 10 is a detail perspective view to show the structure of the wire depresser or packer.

The means for depressing or packing the weft or woof wires and the warp or strand wires in the slots 34 in the bars 30 and in the twister pinions 33 journaled in said bars, is best seen in Figs. 1, 3 and 10, and comprises preferably a frame 68 disposed above and axially of the drum and suspended and movable up and down or toward and from the drum by means of two or more supports 69 having an eccentric connection with the shaft 5. The frame 68 is arranged to coact with each set of bars 30 and their twisters as they assume positions at the top of the drum, as the drum is revolved, when said frame is moved downwardly in an overlying position with respect to the row of twisters and engaging the wires depresses or packs them into the slots 34 of the set of bars 30 and into the slots of the twisters 33 to insure their being properly and efficiently twisted together, when and as the twisters are rotated. Such depressing of the wires results in the necessary warp or strand wire being drawn into the twisters to provide the necessary material for the twists with the weft or woof wires, whereby there is no straining or stretching of such wires during twisting and as a result of the continuous rotation of the drum. Furthermore, I provide for an approximate rotary motion being imparted to the frame 68 as it approaches and leaves a set of bars 30 and the twisters carried thereby, whereby the frame enters into mesh engagement with certain of the wires, as the twisters assume twisting position, moves forward with the twisters a short distance, then as the twisting is completed to be removed from such mesh engagement preparatory to coaction with the next and successive row of twisters. This movement is created by the eccentric connection between the supports 69 and the shaft 5 and thru the provision of the reach bar connections 70, see Figs. 3 and 10 which have a pivotal connection with the supports 69 and a frame part of the machine. The mesh engagement of the frame 68 with certain wires in the netting is made possible by constructing the frame 68 of parallel spaced bars 71, which, when the frame 68 is lowered will straddle a set of bars 30 and twisters carried thereby, and the lower edges of said bars 71 are provided with wire receiving grooves or slots 72 to receive the warp or strand wires, which, when engaged will be depressed, together with the weft or woof wires into the slots in the bars 30 and into the slots in the twister pinions 33, and, thru such action of depressing the wires the necessary wire in the warp or strand wires for the twists is drawn into the twister, supplemented by the staggered arrangement of the slots of the alternate and successive bars 30 and the weaving of the weft or woof wires back and forth between adjacent warp or strand wires.

Referring now to the means for graphically indicating to the operator the exact wire and the exact position of a wire broken and to the means for electrically actuating the lever bar 12 for throwing the clutch which stops the machine, it is to be borne in mind that the wires $a$ and $b$ are led into the machine from blocks, reels, spools or other supply means located to the rear of the machine and that such blocks, reels, spools or other supply means have corresponding designations to the respective indicator means for each wire, to guide the operator in the quick selection of wire to replenish or rethread the machine, as the case may be. Such blocks, reels, spools or other supply means are omitted as they form no part of the present invention.

The indicator mechanism includes the timer shaft 8, previously described as being driven from the shaft 2. Said timer shaft for the greater portion of its length is flattened out as at 73, see Figs. 17, 19 and 23 to give it considerable cross-sectional area, and to give it a cam effect on the wires $a$ and $b$ and provides, therefore, a depresser portion to engage and depress the wires $a$ and $b$ at each half revolution of said timer shaft, as the wires cross below the said shaft. Said wires $a$ and $b$ at the rear and front of said shaft 8 are guided thru the guide tubes 74 and 75, suitably held in the machine frame. Associated with the depresser portion 73 of the shaft 8 are a multiplicity of parallel spaced indicator lever arms or plates 76, see Figs. 17, 19, 22 and 24 which are pivoted at 77 to a frame part and said arms or plates are adapted to assume their lowermost or contact position by weight of gravity and are movable to non-contact positions by the tension in the wires associated with the respective lever arms or plates. It is understood that there is a lever arm or plate 76 for each of the respective wires $a$ and $b$. Each lever arm or plate is provided with a downwardly projecting portion 78, disposed to the rear of the portion 73 of shaft 8 and to each projecting portion is connected a depending slotted wire guide 79 thru which a wire $a$ or $b$ passes. When such a wire assumes, as in this instance, a substantially horizontal position and under tension, the wire bears upwardly against the seat of the slotted guide 79, moving the lever arm or plate 76 on its pivot and moves a contact arm 80 thereof out of contact with a contact member 81 insulated from the frame. On the other hand, when the depresser portion 73 of the shaft 8 engages the several wires $a$ and $b$ and depresses the said wires, as seen in Figs. 19 and 23, the wires are depressed in the slotted guide 79 of their respective lever arms or plates 76 permitting said arms or plates to move forward on their pivots, resulting in the contact 80 moving into contact with the member 81. The lever arms or plates 76, under normal operative conditions move simultaneously and in unison to their lower or contact positions, by weight of gravity, as the elongated ends of the depresser portion 73 of the shaft 8 ride against and depress the wires $a$ and $b$ from against the seats in the slotted wire guides 79, and are similarly moved to non-contact positions when the elongated ends of the depresser portion 73 of the shaft 8 move out of contact with the wires $a$ and $b$ permitting the tension in the wires to bear against the seats of the slotted guides 79 and move said lever plates or arms to the non-contacting positions shown in Figs. 17 and 23. Each of the lever arms or plates 76 are formed or provided with a forward extension or indicator arm 82 which overlie and extend forward of the portions 73 of the shaft 8, see Figs. 17, 19 and 23 and their ends bent at right angles, as at 83, see Figs. 22 and 25, to provide flat surfaces or faces on which appears a graphic indicator of some sort, such for instance a number, which is preferable, or other indicating symbol. Using numbers, there is one each in numerical order corresponding to the number of wires employed in making the netting. And as will be understood, each number corresponds to a number on a block, reel, spool or other supply means at the rear of the machine, and the operator noting the particular indicator denoting a wire broken can immediately and without loss of time trace it to its source and replenish or rethread the machine. The indicator works with the same effect if a wire is permitted to be used up before rethreading or resupplying the machine.

It is pointed out that the indicator arms 82, under normal operative conditions, have their indicating faces lying in the same horizontal plane across the machine and in full view of the operator and move down and up simultaneously and in unison, unless and until a wire or wires break, in which event the arm or arms corresponding to broken wires will drop into contacting position when the electrical circuit is completed to cause a stoppage of the machine. The indicator face or faces of such last mentioned arms will be out of line with the other arms and hence the operator on scanning the indicators will observe these at once and be guided thereby in replenishing or rethreading the machine.

In the operation of the machine and assuming that a wire $a$ or $b$ breaks, it will be readily seen that the tension, therefore, present in such a wire, as would be the case in Fig. 17, having been removed from its respective lever arm or plate 76, that it will naturally drop by weight of gravity and cause its contact 80 to move into contact with the contact member 81 and close an electric circuit to energize something to disconnect the clutch controlling the operation of the machine. It can be further assumed that if a wire breaks at a point leaving some tension in the wire at the point of the portion 73 of the shaft 8, that it only requires a one half revolution of said shaft to have an elongated end of the flattened portion 73 thereof engage and depress the wire, as in Fig. 19, removing such tension, thereby permitting the lever arm or plate 76 to drop and make the necessary contact to close an electric circuit.

Figure 26:
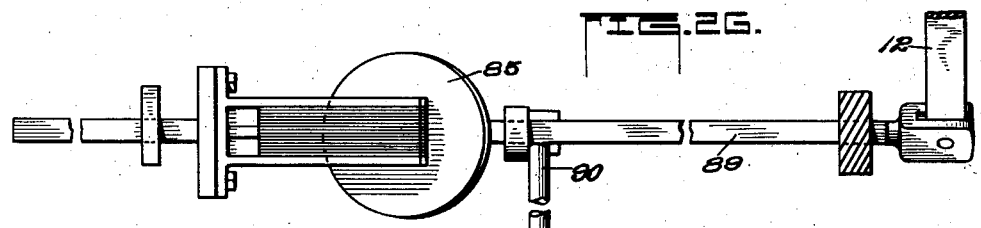
Fig. 26 is a detail in plan, partly broken away, showing the clutch shifting mechanism for automatically stopping the machine on the breaking of a wire, including a solenoid locking and releasing means.
Figure 27:
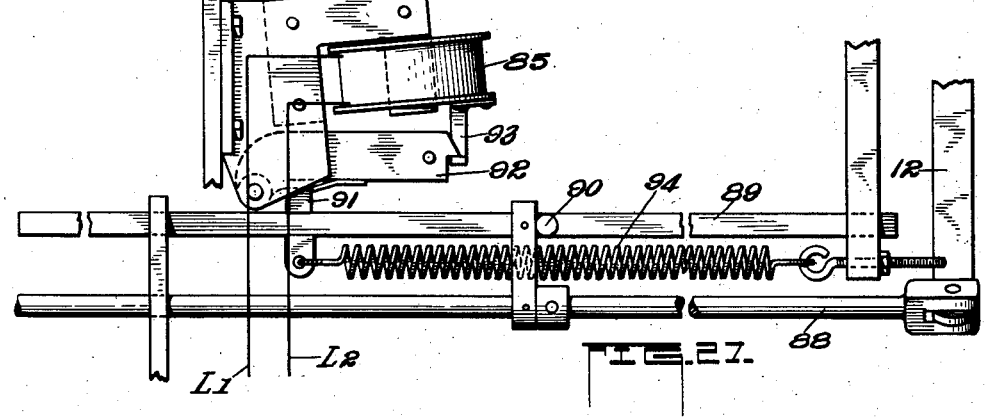
Fig. 27 is an elevation of what is shown in Fig. 26, the clutch shifting mechanism in locked position.
Figure 28:
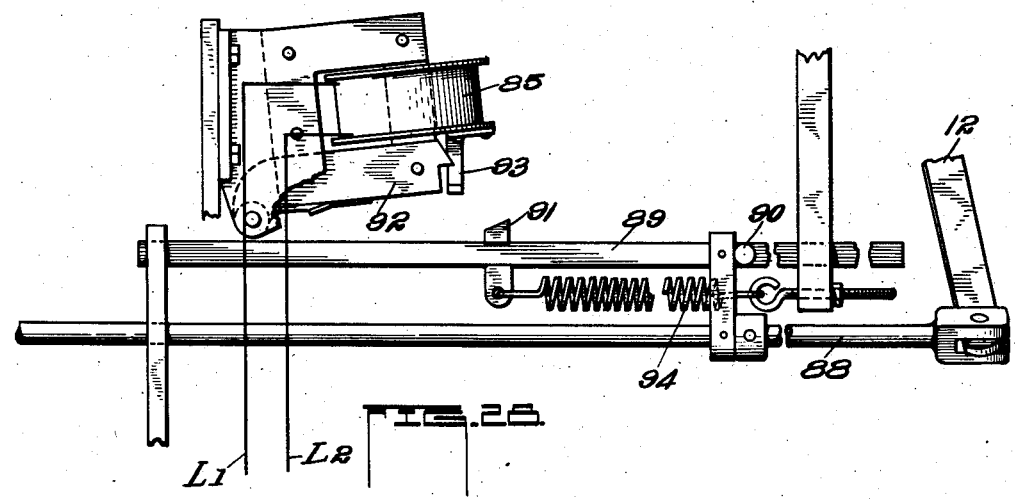
Fig. 28 is a view somewhat similar to Fig. 27, except that the solenoid has been energized releasing the clutch shifting mechanism which has been caused to move to clutch shifted position.

The means employed to operate the lever 12 controlling the clutch part 11 includes a timer 84 on the end of the shaft 8, see Figs. 15, 18, 20 and 21, a solenoid 85 disposed on the front of the machine, see Fig. 1, also Figs. 26, 27 and 28, the contact members 80 and 81 and certain wiring to be referred to.

Referring to the timer 84, it includes the diametrically located immovable contacts 86, and the associated contact 87 rotatable with the shaft 8. The operative and nonoperative positions of the timer contacts in their relation to the contacts 80 and 81 of the respective indicator members 76, is best seen in Figs. 17 and 18, and Figs. 19 and 20. Assuming operating conditions to be normal, the contact 87 and a contact 86 are in engagement during the period when the tension in the wires $a$ and $b$ will cause a removal of the contacts 80 from engagement with the member 81, and contrariwise, when the contact 87 and a contact 86 are in non-engagement, the depresser portion 73 of the shaft 8 is depressing the wires $a$ and $b$, permitting the lever arms or plates 76 to drop and the contacts 80 and 81 to engage, and thereby the continuous operation of the machine. If a wire breaks, however, it is obvious that the contacts 86 and 87 of the timer will be in contact at the same time that contact is made between the members 80 and 81, and when such a condition occurs the electrical circuit to be described will become closed and the solenoid 85 energized to operate the clutch lever 12. Before describing this latter connection it should be noted that the frame of the machine forms a ground for the contacts 80 and 81 and also for the contact 87 of the timer.

Referring now to the lever 12, it has a pivotal connection with an operator's rod 88 which extends across the front of the machine, see Fig. 1, and movably supported in suitable guides on the frame. Also movable on the frame and in suitable guides and in parallel relation with and connected to the operator's rod 88, is a bar 89. This bar has a hand-hold 90 and also a pawl 91 which is adapted to have a locking engagement with a laminated lever 92 in pivotal relation with the solenoid 85 and a stop member 93. Connected with the pawl 91 and, therefore, the bar 89 is a tension spring 94 which also has connection with a frame part of the machine.

Assuming the clutch parts 10 and 11 to be in engagement and the machine in operation, being the position of the parts in Figs. 1 and 27, it will be observed that the pawl 91 is in locked engagement with the lever 92. Just as soon, however, as the solenoid 85 is energized the lever 92 is drawn upward which will release the pawl 91 allowing the spring 94 to act to move the bar 89 and the operator's rod 88 outwardly to the side of the machine which will move the lever 12 and disengage the clutch parts 10 and 11, resulting in the immediate stopping of the machine. The parts are reset when the solenoid is deenergized permitting the lever 92 to drop into engagement with the stop 93 and the bar 89 and operator's rod 88 moved from the nonoperative position in Fig. 28 to the operative position in Figs. 1 and 27.

The wiring diagram in Fig. 29 together with Figs. 1, 17 to 21 inclusive and Figs. 26 to 28 inclusive very clearly indicate the source of the electric current to impart operative movement to parts controlling the stoppage of the machine on the breaking of a wire.

The source of the electric current is traced thru L1 to the solenoid 85 and from the latter to the contact members 80 and 81, assuming they are in contact; thence thru the machine frame, which is the ground, to the contacts 87 and either of 86, assuming they are in contact, and to the source of supply thru the line L2. The flow of the current is controlled, as above pointed out by the making and breaking of the contacts 86 and 87, at the timer and the contacts 80 and 81 at each of the indicator members 76.

What I claim is:—

1. In a wire fence machine, in combination, a revoluble drum including spaced circumferentially arranged radial seats opening out of the surface of the drum, the opposite walls of said seats being parallel for the greater part of their depth and then converging toward each other, one such wall having a longitudinally disposed groove, pairs of guide bars in each seat joined at their base in the seats and also exteriorly of the drum and one such bar having a rib fitting said groove, a rack-bar reciprocally carried between each pair of guide bars, and a multiplicity of slotted twister wheels journaled in the joined portions of each pair of guide bars exteriorly of the drum and in meshing relation with a rack-bar.

2. In a wire fence machine, in combination, a revoluble drum including spaced circumferentially arranged radial seats opening out of the surface of the drum, the opposite walls of said seats being parallel for the greater part of their depth and then converging toward each other, one such wall having a longitudinally disposed groove, pairs of guide bars in each seat joined at their base in the seats and also exteriorly of the drum and one such bar having a rib fitting said groove, the exposed portions of said bars being slotted at predetermined spaced points and the exposed edges of the bars having inclined faces between slots, a rack-bar reciprocally carried between each pair of guide bars, and a multiplicity of slotted twister wheels journaled in the pairs of bars, one each coincident with a slot in said bars and in meshing relation with a rack-bar.

3. In a wire fence machine, in combination, a revoluble drum including spaced circumferentially arranged radial seats opening out of the surface of the drum, the opposite walls of said seats being parallel for the greater part of their depth and then converging toward each other, one such wall having a longitudinally disposed groove, pairs of guide bars in each seat joined at their base in the seats and also exteriorly of the drum and one such bar having a rib fitting said groove, the exposed portions of said bars being slotted at predetermined spaced points and the exposed edges of the bars having inclined faces between slots, the slots in the bars of alternate pairs of bars being slightly staggered in their relation to each other circumferentially of the drum, a rack-bar reciprocally carried between each pair of guide bars, and a multiplicity of slotted twister wheels journaled in the pairs of bars, one each coincident with a slot in said bars and in meshing relation with a rack-bar.

4. In a wire fence machine, in combination, a revoluble drum including spaced circumferentially arranged radial seats opening out of the surface of the drum, the opposite walls of said seats being parallel for the greater part of their depth and then converging toward each other, one such wall having a longitudinally disposed groove, pairs of guide bars in each seat joined at their base in the seats and also exteriorly of the drum and one such bar having a rib fitting said groove, the exposed portions of said bars being slotted at predetermined spaced points and the exposed edges of the bars having inclined faces between slots, the inclinations in alternate pairs of bars extending in opposite directions and the slots in the bars of alternate pairs of bars being slightly staggered in their relation to each other circumferentially of the drum, a rack-bar reciprocally carried between each pair of guide bars, and a multiplicity of slotted twister wheels journaled in the pairs of bars, one each coincident with a slot in said bars and in meshing relation with a rack-bar.

5. In a wire fence machine, in combination, a revoluble drum including spaced circumferentially arranged radial seats opening out of the surface of the drum, the opposite walls of said seats being parallel for the greater part of their depth and then converging toward each other, one such wall having a longitudinally disposed groove, pairs of guide bars in each seat joined at their base in the seats and also exteriorly of the drum and one such bar having a rib fitting said groove, the exposed portions of said bars being slotted at predetermined spaced points and the exposed edges of the bars having inclined faces between slots, whereby one wall of each slot provides an abutment for a wire.

6. In a wire fence machine, in combination, a revoluble drum including pairs of radially arranged bars spaced about said drum, each set of bars being slotted at predetermined spaced points and the edges of the pairs of bars between slots being inclined, whereby one wall of each slot provides an abutment for a wire, slotted twister wheels journaled between said pairs of bars, one at each slot, and a reciprocally carried rack-bar between each pair of bars in mesh with the twisters thereof.

7. In a wire fence machine, in combination, a revoluble drum including pairs of radially arranged bars spaced about said drum, each set of bars being slotted at predetermined spaced points and the edges of the pairs of bars between slots being inclined, whereby one wall of each slot provides an abutment for a wire, the slots in the alternate pairs of bars having a slightly staggered relation to each other circumferentially of the drum, slotted twister wheels journaled between said pairs of bars, one at each slot, and a reciprocally carried rack-bar between each pair of bars in mesh with the twisters thereof.

8. In a wire fence machine, in combination, a revoluble drum, twister wheels and rack-bars in mesh therewith supported about the drum to rotate therewith, each rack-bar carrying a roller at one end, a cylindrically shaped member having a cam groove in which said rollers travel as the drum is revolved, said member having a split portion and the groove a break-joint effect at such split portion, whereby the rollers leaving one end of the groove and before entering the other end must travel thru the split portion of said member, and a reciprocally movable bar adapted to engage each roller on its emergence from said cam groove and move the same thruout the split portion of the member and into position to reenter said cam groove and simultaneously therewith cause a reciprocation of a rack-bar and the rotation of such twister wheels.

9. In a wire fence machine, in combination, a revoluble drum, twister wheels and rack-bars in mesh therewith supported about the drum to rotate therewith, each rack-bar carrying a roller at one end, a cylindrically shaped member having a cam groove in which said rollers travel as the drum is revolved, said member having a split portion and the groove a break-joint effect at such split portion, whereby the rollers leaving one end of the groove and before entering the other end must travel thru the split portion of said member, a reciprocally movable bar adapted to engage each roller on its emergence from said cam groove and move the same thruout the split portion of the member and into position to reenter said cam groove and simultaneously therewith cause a reciprocation of a rack-bar and the rotation of such twister wheels, and a crank-shaft connection for actuating said reciprocally movable bar.

10. In a wire fence machine, in combination, a revoluble drum, twister wheels and rack-bars in mesh therewith, each rack-bar carrying a roller at one end, a cylindrically shaped member having a cam groove in which said rollers travel, said member having a split portion axially of the drum and its cam groove communicating with said split portion at its opposite end portions, whereby the rollers leaving one end of the groove and before entering the other end must travel thru the split portion of said member, a reciprocally movable bar adapted to engage each roller on its emergence from said cam groove and move the same thruout the split portion of the member and into position to reenter said cam groove and simultaneously therewith cause a reciprocation of a rack-bar and the rotation of such twister wheels, said cam groove having a portion concentric with the drum to retain the rack-bars and twister wheels in predetermined positions thruout a part of the travel of said drum, a shaft, and a crank connection between said shaft and said reciprocally movable bar.

11. In a wire fence machine, in combination, a revoluble drum, twister wheels and rack-bars in mesh therewith, each rack-bar carrying a roller at one end, a cylindrically shaped member having a cam groove in which said rollers travel, said member having a split portion axially of the drum and its cam groove communicating with said split portion at its opposite end portions, whereby the rollers leaving one end of the groove and before entering the other end must travel thru the split portion of said member, a reciprocally movable bar having a free end portion adapted to engage each roller on its emergence from said cam groove and move the same thruout the split portion of the member and into position to reenter said cam groove and simultaneously therewith cause a reciprocation of a rack-bar and the rotation of such twister wheels, said cam groove having a portion concentric with the drum to retain the rack-bars and twister wheels in predetermined positions thruout a part of the travel of said drum, a shaft, a crank connection between said shaft and one end of said bar, a cam means on one side of the path of travel of said bar to guide it in its movement, and guiding means engaging said bar on the opposite side of the path of travel thereof.

12. In a wire fence machine, in combination, a revoluble drum, twister wheels and rack-bars meshing therewith, the latter operative during the rotation of the drum and the alternate rack-bars movable from opposite ends of said drum, a cylindrically shaped member at each end of the drum, each having a cam groove, and a split portion axially of the drum with said cam groove communicating with said split portions at opposite end portions thereof, a roller on the outer end of each alternate rack-bar, said rollers movable during the rotation of the drum thru said cam grooves and along and thruout the split portions of said members, during the latter movement of which the rack-bars are reciprocated to rotate said twister wheels, rack-bar actuating bars at each end of the drum, means to reciprocate said last mentioned bars alternately in relation to each other, said bars having free end portions movable in the split portions of said members to engage said rollers on their emergence from a cam groove and move the same to the entrance ends of said cam grooves and to reciprocate said rack-bars during the movement of the rollers in said split portions, the free ends of said bars providing switching surfaces across which the rollers travel when leaving one end of a cam groove and before entering the other end of such groove.

13. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a plurality of wire guiding members arranged to deliver the weft or woof wires to the twisters, a plurality of wire guiding members arranged to deliver the warp or strand wires to the twisters, means to shift the warp or strand wire guiding means in unison and in timed relation to the positioning of the twisters to wire receiving positions, whereby to accommodate the positions of such wires to the staggered positions of alternate rows of twisters, and means to shift the weft or woof wire guiding means in unison and in relation to the positioning of the twisters to wire receiving positions and alternately back and forth from one warp or strand wire to another, whereby the weft or woof wires are woven back and forth from one warp or strand wire to another and by means of the twisters connected therewith between each alternate movement.

14. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a plurality of wire guiding members arranged to deliver the weft or woof wires to the twisters, a plurality of wire guiding members arranged to deliver the warp or strand wires to the twisters, means to shift the warp or strand wire guiding means in unison and in timed relation to the positioning of the twisters to wire receiving positions, whereby to accommodate the positions of such wires to the staggered positions of alternate rows of twisters, means to shift the weft or woof wire guiding means in unison and in timed relation to the positioning of the twisters to wire receiving positions and alternately back and forth from one warp or strand wire to another, and means to depress the respective wires into the twisters associated with each rack-bar as each rack-bar and its twisters move to a predetermined position in advance of the wire guiding means, during the rotation of the drum.

15. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a plurality of wire guiding members arranged to deliver the weft or woof wires to the twisters, a plurality of wire guiding members arranged to deliver the warp or strand wires to the twisters, means to shift the warp or strand wire guiding means in unison and in timed relation to the positioning of the twisters to wire receiving positions, whereby to accommodate the positions of such wires to the staggered positions of alternate rows of twisters, means to shift the weft or woof wire guiding means in unison and in timed relation to the positioning of the twisters to wire receiving positions and alternately back and forth from one warp or strand wire to another, means to depress the respective wires into the twisters associated with each rack-bar as each rack-bar and its twisters move to a predetermined position in advance of the wire guiding means, during the rotation of the drum, an operating means, an eccentric connection between said depressing means and said operating means, and means to impart sidewise movement to the depressing means on the approach and passing of the twisters in relation to the depressing of said depressing means.

16. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a pair of bars supported for movement axially of the drum, a shaft, means operated by said shaft to reciprocate one of said bars a distance corresponding to the distance between the alternate staggered twisters, means operated by said bars a distance corresponding to the distance between adjacent twisters associated with each rack-bar, wire guiding means connected to and movable with said first mentioned bar for guiding and laying warp or strand wires in the twisters, and wire guiding means connected to and movable with said second mentioned bar for guiding and laying weft or woof wires in the twisters and for weaving said weft or woof wires alternately between adjacent warp or strand wires for connection therewith.

17. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a pair of bars supported for movement axially of the drum, a shaft, means operated by said shaft to reciprocate one of said bars a distance corresponding to the distance between the alternate staggered twisters, means operated by said bars a distance corresponding to the distance between adjacent twisters associated with each rack-bar, wire guiding means connected to and movable with said first mentioned bar for guiding and laying warp or strand wires in the twisters, wire guiding means connected to and movable with said second mentioned bar for guiding and laying weft or woof wires in the twisters and for weaving said weft or woof wires alternately between adjacent warp or strand wires for connection therewith, means to adjust said operating means axially of the drum, and means to depress the respective wires into the twisters associated with each rack-bar as each rack-bar and its twisters move to a predetermined position in advance of the wire guiding means, during the rotation of the drum.

18. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a pair of bars supported for movement axially of the drum, a shaft, two sets of cams in spaced relation on said shaft, each set of cams having complementary acting faces, a roller on one of said bars adapted to ride on the faces of one set of cams, whereby movement is imparted to said bar a distance corresponding to the distance between the alternate staggered twisters, a lever having a roller adapted to ride on the faces of the other set of cams, said lever geared to the second mentioned bar, whereby when it is moved it is reciprocated a distance corresponding to the distance between adjacent twisters associated with each rack-bar, wire guiding means connected to and movable with said first mentioned bar for guiding and laying warp or strand wires in the twisters, and wire guiding means connected to and movable with said second mentioned bar for guiding and laying weft or woof wires in the twisters and for weaving said weft or woof wires alternately beteen adjacent warp or strand wires for connection therewith.

19. In a wire fence machine, in combination, a revoluble drum, a plurality of rack-bars disposed on and about the drum, means to reciprocate alternate rack-bars in opposite directions during the rotation of the drum, a plurality of slotted twister wheels associated with and operated by each rack-bar, the twister wheels associated with alternate rack-bars having a slightly staggered relation with respect to each other, a pair of bars supported for movement axially of the drum, a shaft, two sets of cams in spaced relation on said shaft, each set of cams having complementary acting faces, a roller on one of said bars adapted to ride on the faces of one set of cams, whereby movement is imparted to said bar a distance corresponding to the distance between the alternate staggered twisters, a lever having a roller adapted to ride on the faces of the other set of cams, said lever geared to the second mentioned bar, whereby when it is moved it is reciprocated a distance corresponding to the distance between adjacent twisters associated with each rack-bar, wire guiding means connected to and movable with said first mentioned bar for guiding and laying warp or strand wires in the twisters, wire guiding means connected to and movable with said second mentioned bar for guiding and laying weft or woof wires in the twisters and for weaving said weft or woof wires alternately between adjacent warp or strand wires for connection therewith, and means to depress the respective wires into the twisters associated with each rack-bar as each rack-bar and its twisters move to a predetermined position in advance of the wire guiding means, during the rotation of the drum.

20. In a wire fence machine, in combination, a revoluble drum, a plurality of rows of slotted twister wheels mounted thereon, a rack-bar for each row of twisters, means to successively operate said rack-bars, means to guide the warp or strand wires to the twisters, means to guide the weft or woof wires to the twisters, a drive shaft, two sets of cams on the drive shaft, means operated by one set of cams to move the guiding means for the warp or strand wires, means operated by the other set of cams to move the guiding means for the weft or woof wires, a depresser for depressing the respective wires into each row of twisters as they are moved to a predetermined position by the drum, an operating shaft, means to operate the operating shaft from the driving shaft, and means to eccentrically connect the depresser with said operating shaft.

21. In a wire fence machine, in combination, a revoluble drum, a plurality of rows of slotted twister wheels mounted thereon, a rack-bar for each row of twisters, means to successively operate said rack-bars, means to guide the warp or strand wires to the twisters, means to guide the weft or woof wires to the twisters, a drive shaft, two sets of cams on the drive shaft, means operated by one set of cams to move the guiding means for the warp or strand wires, means operated by the other set of cams to move the guiding means for the weft or woof wires, means permitting adjustment of the respective sets of cams on the drive shaft, a depresser for depressing the respective wires into each row of twisters as they are moved to a predetermined position by the drum, an operating shaft, means to operate the operating shaft from the driving shaft, and means to eccentrically connect the depresser with said operating shaft.

22. In a wire fence machine, in combination, a plurality of twisters, means to operate said twisters, means to direct warp or strand wires to said twisters, means to direct weft or woof wires to said twisters, an indicating means to graphically indicate the breaking of any of the several wires, said indicating means comprising a plurality of movable members, one for each wire, and adapted to be acted upon by such wires and each member bearing a suitable indicating character, mechanism for stopping the operation of the machine including an electrical circuit, said circuit being controlled by the movement of said members and closed on predetermined positions of said members and when a wire or wires corresponding thereto, are broken.

23. In a wire fence machine, in combination, a plurality of twisters, means to operate said twisters, means to direct warp or strand wires to said twisters, means to direct weft or woof wires to said twisters, a drive shaft, a source of power and clutch means for clutch connecting said shaft with said source of power, means to operate said twister operating means from said shaft, clutch moving means, an electrical circuit, a solenoid in said circuit, means controlled by said solenoid adapted when the solenoid is energized to actuate said clutch moving means, an indicating means to graphically indicate the breaking of any one of the several wires, said indicating means comprising a plurality of movable members, one for each wire, and adapted to be acted upon by such wires and each member bearing a suitable indicating character, means to open and close said electrical circuit, said means controlled by the movement of said members, at predetermined positions of said members and when a wire or wires corresponding thereto, are broken.

24. In a wire fence machine, in combination, a plurality of twisters, means to operate said twisters, means to direct warp or strand wires to said twisters, means to direct weft or warp wires to said twisters, an indicating means to graphically indicate the breaking of any of the several wires, said indicating means comprising a plurality of movable members, one for each wire, and adapted to be acted upon by such wires and each member bearing a suitable indicating character, said members movable to indicating position on the breaking of a wire or wires and the moving of any such wires to non-acting positions.

25. In a wire fence machine, in combination, twisting means, means to actuate said twisting means, means to guide wires to said twisting means, a plurality of pivotally supported indicating members, one for each wire, and movable to nonindicating position by contact of the wires therewith, said members movable to indicating position by weight of gravity on the breaking of a wire or wires, and each member having an indicating character.

26. In a wire fence machine, in combination, twisting means, means to actuate said twisting means, clutch controlled means for imparting movement to said twister actuating means, means to guide wires to said twisting means, a plurality of pivotally supported indicating members, one for each wire, and movable to nonindicating position by contact of the wires therewith, said members movable to indicating position by weight of gravity on the breaking of a wire or wires, and each member having an indicating character, an electrical circuit, means operated on the closing of said circuit adapted to declutch said clutch controlled means for automatically stopping the machine, and electrical contact means operable when said members move to indicating position, on the breaking of a wire, whereby to close said electrical circuit.

27. In a wire fence machine, in combination, wire twisting means, means to operate said twisting means, means to guide wires to said twisting means, a drive shaft, clutch means to control the operation of said shaft, means to operate said twister operating means from said shaft, means to automatically move said clutch means to inoperative position, a timer shaft and electrical timer associated therewith, said timer shaft having a body portion adapted, as the shaft is rotated to depress said wires, a plurality of movable indicating members, one for each wire, adapted when the body portion of said timer shaft is inoperative on said wires to engage with their respective indicating members and move the same to nonindicating position, each indicating member having an indicating character and automatically movable to indicating position when a wire breaks, a plurality of electrical contact members, one each of which comprises an indicating member, the same adapted to make contact on the breaking of a wire, an electrical circuit including said contact members, a solenoid and said timer, said circuit being closed and current caused to flow thru and to energize said solenoid, on the breaking of a wire and on the engagement of said contact members, and means controlled by said solenoid and operable when the same is energized and adapted to actuate said clutch moving means, whereby to stop the machine on the breaking of a wire.

28. In a wire fence machine, a plurality of movable indicators each having means to be engaged by a wire, means for effecting periodic lateral deflecting movement of each wire thereby to effect corresponding periodic movement of each indicator, stopping means for the machine, and means whereby upon breakage of a wire the indicator thereof will effect operation of the stopping means.

29. In a wire fence machine, a plurality of gravity responsive indicators, each having means to engage a wire, means to periodically laterally deflect each wire so as to cause same to effect movement of the indicator thereof, stopping means for the machine, and means operable by each indicator upon breaking of the wire thereof and consequent release of the indicator for gravitating movement, to actuate said stopping means.

WILLIAM H. SOMMER.